United States Patent [19]
Fahrner

[11] 3,805,137
[45] Apr. 16, 1974

[54] SAMPLED SIGNAL SERVO CONTROL SYSTEM

[75] Inventor: Richard L. Fahrner, Huntington Beach, Calif.

[73] Assignee: The United States of America as represented by the Secretary of the Army, Washington, D.C.

[22] Filed: Nov. 21, 1972

[21] Appl. No.: 308,617

[52] U.S. Cl. .............................. 318/636, 318/616
[51] Int. Cl. .......................................... G05b 11/01
[58] Field of Search ............................ 318/636, 616

[56] References Cited
UNITED STATES PATENTS

| | | | |
|---|---|---|---|
| 3,273,035 | 9/1966 | Inderhees | 318/636 X |
| 3,211,974 | 10/1965 | Rhodes | 318/636 X |
| 3,245,073 | 4/1966 | Strunk et al. | 318/636 X |
| 3,436,636 | 4/1969 | James | 318/636 X |
| 3,591,779 | 7/1971 | Sutherland | 318/636 X |
| 3,675,135 | 7/1972 | Weller | 318/636 UX |

Primary Examiner—T. E. Lynch
Attorney, Agent, or Firm—Lawrence A. Neureither; Leonard Flank; Robert C. Sims

[57] ABSTRACT

A servo system obtains error signals from a sample and hold system. A rate feedback is provided from the output of a servo, and achieved parameter signal is fed back to the sample and hold system to correct the error signal upon the next sample interval. A feedback to the input of the servo system is provided by an integrator which integrates the rate of change of the servo system's parameter each sample interval.

2 Claims, 1 Drawing Figure

PATENTED APR 16 1974 3,805,137
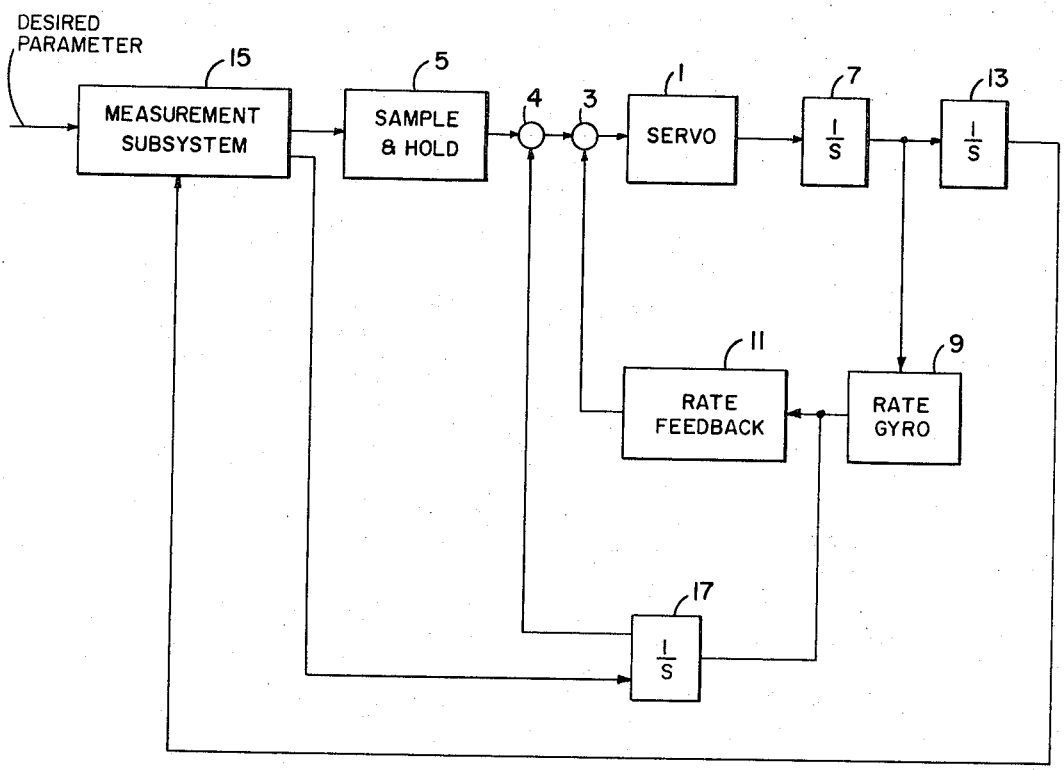

SAMPLED SIGNAL SERVO CONTROL SYSTEM

SUMMARY OF THE INVENTION

A servo system which has as an input the output of a sample and hold circuit can become unstable if the sample period is too large in comparison to the servo response time. Typically the servo system feeds its parameter position to a measurement subsystem which compares this parameter with a desired parameter input. The measurement subsystem will produce a signal to a sample and hold circuit. The same and hold circuit is connected to the input of the servo system to cause change thereby. An integrator is provided to supply parameter acceleration to a rate gyro which in turn feeds its signal through a rate feedback to a combining means (mixer) at the input of the servo.

In order to prevent the servo system from becoming unstable over a long sample period an integrator is connected to the output of the rate gyro and fed back to a further mixer so as to combine with the sample and hold error signal and in effect neutralize the signal as the parameter of the servo system changes. This integrator is set to zero at the start of each sample interval.

BRIEF DESCRIPTION OF THE DRAWING

The single FIGURE is a block diagram illustrating the preferred embodiment of the invention.

DESCRIPTION OF THE PREFERRED EMBODIMENT

Referring to the FIGURE there is shown a servo system comprising a servo 1 which has an input from combining means 3 and 4 and sample and hold circuit 5. The output of the servo 1 will be parameter acceleration which is integrated by integrator 7 and fed to rate gyro 9. The output of rate gyro 9 is fed through rate feedback circuit 11 to mixer 3 to compensate for hunting of the system as is well known in the art. A further integrator 13 provides an output signal which is indicative of the parameter achieved by the servo system. This achieved parameter is fed through to a measurement subsystem 15 where the achieved parameter is compared with a desired parameter input. The subsystem 15 will generate an error voltage which is fed to the sample and hold circuit 5.

The circuit described so far can become unstable in that the error voltage seen by the servo system is a constant value over the sample period regardless of the corrections made by the servo system. If the servo response time is fast in comparison to the sample period time the system may oscillate uncontrollably. In order to prevent this, a further integrator 17 is provided to integrate the output of rate gyro 9 and feed its output to combining means 4. Integrator 17 is set to zero at each sample time as a result from a signal from the measurement subsystem 15. This can be accomplished by grounding the output of an op-amp integrator (17) at each sample time. By combining the output of integrator 17 with the error from sample and hold circuit 5, the servo system 1 is controlled as if it were in a closed loop system instead of an open loop system as was the case without the circuit 17. Feedback from integrator 17 will prevent the servo system from overcorrecting thereby preventing the system from being unstable. Integrators 7 and 13, rate feedback circuit 11, rate gyro 9, sample and hold circuit 5, and measurement subsystem 15 can take the shape of any of the well known servo and servo controlled elements.

I claim:

1. A servo control system having a parameter servo control loop which comprises a servo means having an input and an output; first, second, and third integrators each having an input and an output; an error generating subsystem having two inputs and an output; said first integrator having its input connected to the output of the servo means so as to provide an output which is indicative of the parameter rate of change; the output of said first integrator being connected to the input of said second integrator whereby said second integrator will provide an output which indicates achieved position of the parameter; one of the inputs of said error generating subsystem being adapted to receive a desired parameter signal; the other input to the subsystem being connected to the output of said second integrator whereby the output of said error generating subsystem will be an error indication of the desired parameter and the obtained parameter; a sample and hold circuit means having an input and an output; first and second combining means each having two inputs and an output; said subsystem output being connected to the input of said sample and hold circuit means; the output of said sample and hold circuit means being connected to one of the inputs of the first combining means; the output of said first combining means being connected to one of the inputs of said second combining means; the output of said second combining means being connected to the input of said servo means; a rate gyro means having an input and an output; a rate feedback means having an input and an output; the input of said rate gyro means being connected to the output of said first integrator; the output of said rate gyro being fed to the input of said rate feedback means and to the input of said third integrator; the output of said rate feedback means being connected to the other input of said second combining means; and the output of said third integrator being connected to the other input of said first combining means.

2. A servo control system as set forth in claim 1 wherein said third integrator has a set to zero input; and connection means from said error generating subsystem to said set to zero input of said third integrator whereby said integrator is returned to zero value at the start of each sample and hold.

* * * * *